United States Patent [19]
Hatanaka et al.

[11] Patent Number: 5,914,852
[45] Date of Patent: Jun. 22, 1999

[54] SOLID ELECTROLYTE CAPACITOR AND ITS MANUFACTURE

[75] Inventors: Kazuhiro Hatanaka; Atsuko Kaneko, both of Tokyo, Japan

[73] Assignee: Nippon Chemi-Con Corporation, Tokyo, Japan

[21] Appl. No.: 08/981,515

[22] PCT Filed: Mar. 31, 1997

[86] PCT No.: PCT/JP97/01114

§ 371 Date: Feb. 18, 1998

§ 102(e) Date: Feb. 18, 1998

[87] PCT Pub. No.: WO97/41577

PCT Pub. Date: Nov. 6, 1997

[30] Foreign Application Priority Data

Apr. 26, 1996 [JP] Japan .................................. 8-131374
May 24, 1996 [JP] Japan .................................. 8-153013

[51] Int. Cl.$^6$ ...................................................... H01G 9/00
[52] U.S. Cl. ........................... 361/523; 361/525; 361/528; 361/532
[58] Field of Search .................................... 361/504, 511, 361/512, 523, 524, 525, 530, 528, 529, 508, 509, 314, 315; 252/500, 62.2, 513; 428/209, 921; 29/25.03; 429/192, 209, 129, 212, 218, 245, 247, 146; 427/79, 80

[56] References Cited

U.S. PATENT DOCUMENTS 5,368,959  11/1994  Koksbang et al. ....................... 429/212
5,536,601  7/1996  Koksbang et al. ....................... 429/245
5,766,515  6/1998  Jonas et al. ............................... 252/500

*Primary Examiner*—Kristine Kincaid
*Assistant Examiner*—Anthony Dinkins
*Attorney, Agent, or Firm*—Young & Thompson

[57] ABSTRACT

A solid electrolyte layer of dense and uniform conductive polymer is formed with a capacitor element of the wound type in order to provide a solid electrolytic capacitor of improved electric characteristics and large capacity and a process for manufacturing the same. The capacitor element (10) in which an anode foil (1) and a cathode foil (2) are wound by means of a separator (3) is impregnated with a solution mixture of 3,4-ethylendioxythiophene and an oxidizing agent so that the solution mixture is penetrated into the inside of the capacitor element (10) for the gentle polymerization reaction of 3,4-ethylendioxythiophene with an oxidizing agent during and after the impregnation in order to produce polyethylenedioxythiophene for forming a solid electrolyte layer within the capacitor element. Further, a solid electrolytic capacitor in which an electrolytic layer is sufficiently achieved with a low impedance is obtainable. 3,4-ethylendioxythiophene is polymerized by an oxidizing agent in a solution of one or more alcohols which is selected from dihydric alcohol, trihydric alcohol and dihydric alcohol derivatives. Accordingly, the reaction is rapidly enhanced maintaining an improved condition in the polymerizing reaction, and the electrolyte layer having a high degree of polymerization, improved conductivity and adhesive properties to the oxide dielectric layer is formed.

21 Claims, 2 Drawing Sheets

SOLID ELECTROLYTE CAPACITOR AND ITS MANUFACTURE

TECHNICAL FIELD

The present invention relates to a solid electrolytic capacitor and a process for manufacturing the same and particularly to a solid electrolytic capacitor which employs conductive polymers as an electrolyte and to a solid electrolytic capacitor of improved impedance characteristics.

PRIOR ART

An electrolytic capacitor is comprised of an anode of valve action metals such as tantalum, aluminum and the like having fine pores or etching pits, and formed thereon with an oxide coating layer as a dielectric body from which electrodes are drawn.

The drawing of the electrode from the oxide coating layer takes place by a conductive electrolyte layer. Consequently, in the electrolytic capacitor, the electrolyte layer bears a true cathode. For example, in the aluminum electrolytic capacitor, a liquid electrolyte is used as a true electrode, and a cathode merely provides an electrical connection between a liquid electrolyte and an external terminal.

The electrolyte layer which functionates as a true electrode requires adhesive properties, denseness, uniformity and the like with the oxide coating layer. In particular, adhesive properties at the inside of fine pores or etching pit of the anode greatly affect to electrical properties and hitherto a number of electrolyte layers have been proposed.

In the solid electrolytic capacitor, a solid conductive electrolyte is used in place of a liquid electrolyte which lacks in impedance characteristics at a high-frequency region on account of ionic conduction as known by manganese dioxide and 7,7,8,8-tetracyanoquinodimethane (TCNQ) complex.

The solid electrolyte layer of manganese dioxide is formed by dipping an anode element of sintered body of tantalum into an aqueous solution of manganese nitrate for subsequent thermal decomposition at approximately 300° C.–400° C.

In the capacitor employing the solid electrolyte layer thus formed, the oxide coating layer is likely subjected to breakage on the thermal decomposition of manganese nitrate with a possible increment of the leakage current and further a satisfactory impedance characteristics could not be obtained because of a high specific resistance of the manganese dioxide per se.

Moreover, the lead wire damaged by a thermal treatment needed an alternate external terminal for connection as an additional step.

A solid electrolytic capacitor with use of TCNQ complex is disclosed in the Japanese Laid-Open Patent Publication 58-191414, wherein TCNQ complex is objected to the thermal melting with subsequent dipping into and coating with an anode to form a solid electrolyte layer. TCNQ complex has a high electrical conductivity with improved results in frequency and thermal characteristics.

TCNQ complex soon after molten tends, however, to transform into an insulator with difficulty in the temperature control during the manufacturing process of the capacitor and since TCNQ complex per se lacks in heat resistance a remarkable variation in the characteristics is caused by a soldering heat when TCNQ is mounted on a printing base.

In order to solve the matters to be caused by those manganese dioxide or TCNQ complex, it has been tried to use such conductive polymers as polypyrrole for a solid electrolyte layer.

The conductive polymers which are represented by a polypyrrole are mainly formed by a chemical oxidative polymerization process or a chemical polymerization or an electrolytic oxidative polymerization process or an electrolytic polymerization, but with a difficulty in forming a film with high strength and denseness.

On the other hand, the electrolytic oxidative polymerization process needs an application of a voltage to an object for forming a film with a difficulty in application it to an anode for the electrolytic capacitor formed on its surface with an oxide coating layer of an insulator. Thus, there is proposed a process of coating the oxide coating layer previously with a conductive prime coating layer of for example conductive polymer film which is chemically polymerized with an oxidizing agent to form a conductive polymer film coating layer on the oxide coating layer and subsequently subjecting to an electrolytic polymerization with the prime coating layer as an electrode in order to form an electrolyte layer as disclosed in the Japanese Laid-Open Patent Publication 63-173313 and the Japanese Laid-Open Patent Publication 63-158829 where a manganese dioxide is used to form a prime coating layer.

Such conventional process, however, needs a tedious production step for previously forming a prime coating layer with an extreme difficulty in continuous production of a conductive polymer film with homogeneous thickness over a wide range and also because of growing of a solid electrolyte layer from the vicinity of an external electrode for polymerization arranged on a coating surface of the anode in accordance with the electrolytic polymerization.

Thus, it has been tried to wind foil anode and cathode with a separator to form a so-called wound type capacitor element which is then dipped in a monomer solution of pyrrole and the like and an oxidizing agent to form an electrolyte layer of a conductive polymer film prepared merely by means of a chemical polymerization.

The wound type capacitor element has been known by an aluminum electrolytic capacitor, but it has been desired to avoid any tediousness of an electrolytic polymerization by retention of the conductive polymer layer with the separator and to more increase a capacity by the foil electrode with an enlarged surface area.

In addition, an employment of the wound type capacitor element is desired to hold opposite electrodes and a separator at a constant clamping pressure for contribution to adhesive properties of opposite electrodes and the electrolyte layer.

It has been, however, appreciated that the capacitor element when impregnated with a solution mixture of a monomer solution with an oxidizing agent is not formed through an inside thereof with a solid electrolyte layer so that a desired electrical characteristics is not obtainable.

When the capacity element was impregnated with a monomer solution and an oxidizing agent separately or a polymerization temperature of the solution at the reaction was went down, however, a certain improved electrical characteristics could be obtained although there remained a problem of an insufficient heat-resistance.

This defect is considered to cause because of growth of the solid electrolyte layer in the vicinity of the terminal surface of the capacitor element which interferes the subsequent osmosis of the solution to disturb a sufficient osmosis of the solution through the inside of the capacitor element so that the solid electrolyte layer of dense and uniform characteristics could not be formed.

Moreover, since the chemical polymerization takes place at a low temperature, a strict temperature control is required with a complexed manufacturing mechanism and an increased cost.

On the other hand, the researches of the conductive polymers of various kinds have revealed a polyethylenedioxythiophene (PEDT) which has a gentle reaction rate but excellent adhesive properties with the oxide coating layer of the anode as disclosed in the Japanese Laid-Open Patent Publication 2-15611.

Recently, the digitalization of the electronic apparatus with the high-frequency requires the capacitor to minimize but with a large capacity and a low impedance at the high frequency region.

To meet the aforementioned requirements, a solid electrolytic capacitor applying a manganese dioxide as an electrolyte has hitherto been used. This electrolyte of manganese dioxide of the solid electrolytic capacitor is, however, formed of thermal decomposition of manganese nitrate, although so formed manganese dioxide results in a high electrical conductivity and the solid electrolytic capacitor with the manganese dioxide of this type is no longer tolerated to an impedance characteristics to be required in the latest high frequency region.

To meet the requirements, use has been made of an organic semiconductor having a high electric conductivity as a solid electrolyte.

For example, a solid electrolytic capacitor applying TCNQ complex for the solid electrolyte is disclosed in the Japanese Laid-Open Patent Publication 58-17609, and a solid electrolyte capacitor applying a polypyrrole for the solid electrolyte is disclosed in the Japanese Laid-Open Patent Publication 60-37114. However, either inferior heat-resistance of TCNQ complex or inferior voltage resistance of polypyrrole results in drawbacks of the electrolytic capacitor.

Accordingly, as disclosed in the Japanese Laid-Open Patent Publications 2-15611 and 3-114213, a solid electrolytic capacitor of polythiophen which has excellent impedance characteristics, improved heat-resistance and voltage resistance as a solid electrolyte has been developed.

It has been revealed, however, that the solid electrolytic capacitor produced with polythiophen tends to release the electrolytic layer with inferior tan δ and ESR characteristics.

The present invention aims to polyethylenedioxythiophene which has a gentle polymerization reaction rate and to form a solid electrolyte layer of dense and uniform conductive polymer with capacitor element of the wound type in order to provide a solid electrolytic capacitor of improved electric characteristics with large capacity and a process for manufacturing the same.

The present invention further aims to an influence of a solvent on the polymerization reaction by observing a phenomenon of an advancement of the polymerization reaction of thiophene with evaporation and fluidization of the solvent and to provide a solid electrolytic capacitor of low impedance and excellent tan δ and ESR where an electrolyte layer which is formed in improved and tight adhesion to an oxide coating layer is provided.

DISCLOSURE OF THE INVENTION

In the solid electrolytic capacitor according to the present invention, a capacitor element in which anode and cathode foils are wound with a separator of glass paper is impregnated with a solution mixture of 3,4-ethylendioxythiophene and an oxidizing agent, and the solution mixture penetrated into the separator is subject to the polymerization reaction to produce a polyethylenedioxythiophene for forming an electrolytic layer to be held by the separator.

Further, iron p-toluenesulfonate dissolved in ethylene glycol is used as an oxidizing agent.

Further, in the electrolytic capacitor according to the present invention, a glass paper may be replaced by a separator of a blend of the glass paper with a paper preferably of less than 80%.

To produce an electrolytic capacitor according to the invention, a solution mixture of 3,4-ethylendioxythiophene and an oxidizing agent is penetrated into a capacitor element in which anode and cathode foils are wound with a separator of a glass paper or a blend of a glass paper with a paper and the solution mixture penetrated into the separator is subjected to a polymerization reaction to produce a polyethylenedioxythiophene.

Further, a solution mixture of 3,4-ethylendioxythiophene and an oxidizing agent after impregnated into a capacitor element in which anode and cathode foils are wound by a separator of a glass paper or a blend of glass paper with paper is left for 15–2 hours at 25–100° C., preferably for 4 hours at 50° C. and the same operations are repeated for a several times to produce polyethylenedioxythiophene.

Moreover, a blend ratio of 3,4-ethylendioxythiophene and an oxidizing agent is preferably in the range of 1:3 to 1:15.

Thus, according to the present invention, the capacitor element in which anode and cathode foils are wound by a separator of glass paper or a blend of a glass paper and a paper is impregnated with a solution mixture of 3,4-ethylendioxythiophene and an oxidizing agent so that the solution mixture is penetrated into the inside of the capacitor element for the gentle polymerization reaction of 3,4-ethylendioxythiophene with an oxidizing agent during and after the impregnation in order to produce polyethylenedioxythiophene for forming a solid electrolyte layer within the capacitor element and the solid electrolyte layer is suspended by the separator from its initial production.

Further, in the solid electrolytic capacitor according to the present invention a dielectric layer of valve action metal oxide and an electrolyte layer of conductive polymer are successively formed on the surface of the valve action metal, wherein said electrolyte layer of conductive polymer is polyethylenedioxythiophene which is formed by means of polymerization reaction of 3,4-ethylenedioxythiophene with an oxidizing agent in one or more solvent(s) selected from dihydric alcohol, trihydric alcohol and dihydric alcohol derivatives.

Furthermore, a process according to the present invention comprise a step of forming a dielectric layer of a valve action metal oxide on a surface of the valve action metal, a step of adhering of a solution containing 3,4-ethylenedioxythiophene, one or more solvent which is selected from dihydric alcohol, trihydric alcohol and dihydric alcohol derivatives and an oxidizing agent to a dielectric layer of oxide, and a step of heating for facilitating a polymerization reaction for production and adhesion of polyethylenedioxythiophene as an electrolyte layer on the dielectric layer of oxide.

Solvents behave stably in the polymerization reaction and are maintained in good condition during the reaction for performing a quick reaction to produce an electrolytic layer having a high polymerization degree, improved electrical conductivity and adhesive property to the dielectric layer of oxide so that a solid electrolytic capacitor in which an electrolytic layer is sufficiently adhered to an oxide coating layer with an excellent tan δ and ESR and a low impedance is obtainable.

BEST MODE FOR WORK OF THE INVENTION

An embodiment according to the present invention shall be explained below with reference to the drawings.

Figure 1:
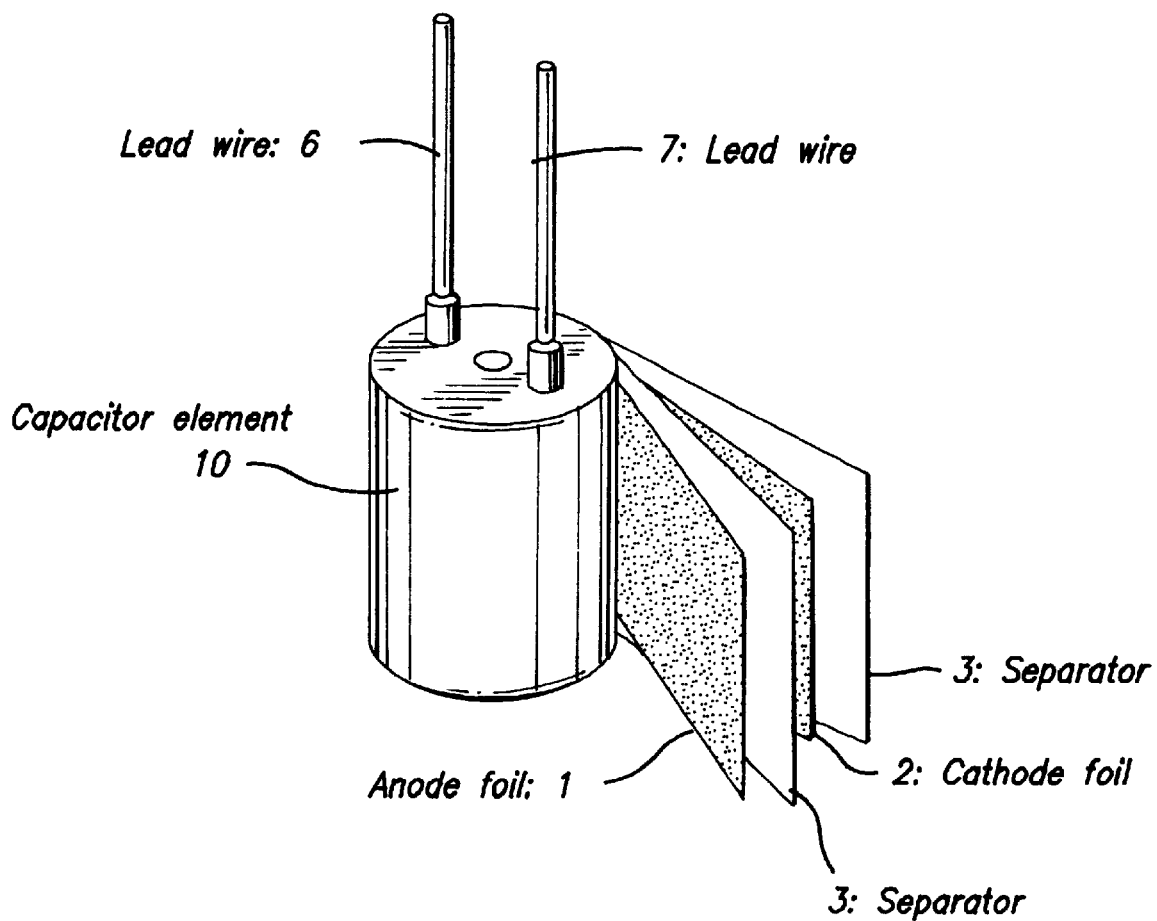
FIG. 1 shows an exploded perspective view of a capacitor element according to the present invention.

The FIG. 1 shows a solid electrolytic capacitor according to the present invention, wherein an anode foil (1) of a valve action metal such as aluminum with an oxide coating layer formed on the surface of the metal and a cathode foil (2) are wound by a separator (3) of a glass paper or a blend of a glass paper and a paper to provide a capacitor element. The capacitor element is then impregnated with a solution mixture of 3,4-ethylenedioxythiophene with an oxidizing agent, and the solution mixture which is penetrated into the separator (3) is subjected to a polymerization reaction to produce a polyethylenedioxythiophene for forming a solid electrolytic layer (5) which is suspended by the separator (3).

Figure 2:
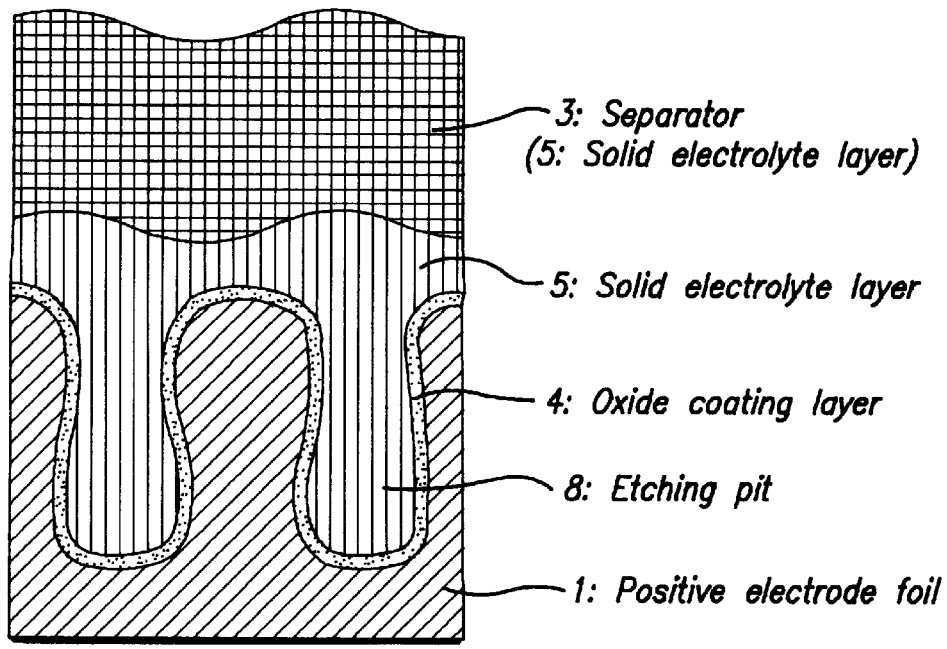
FIG. 2 shows a partially enlarged view of an anode foil used in the present invention.

The anode foil (1) is made of a valve action metal such as aluminum and the surface thereof is roughened by an electrochemical etching treatment in an aqueous chloride solution to provide a number of etching pits (8) as shown in FIG. 2. Further the anode foil (1) on its surface is formed with an oxide coating layer (4) of dielectric body by applying a voltage in an aqueous solution such as ammonium borate and the like.

The cathode foil (2) is made of aluminums like the anode foil (1) and the surface thereof is treated by only etching.

The anode foil (1) and the cathode foil (2) are connected with lead wires (6) and (7) by the known means such as stitch, ultrasonic welding and the like, for external connections with respective electrodes. The lead wires (6) and (7) are made of aluminum and the like and provide external electric connections with connections of the anode foil (1) and the cathode foil (2) and are derived from the terminal surface of the wound capacitor element (10).

The separator (3) consist of a glass paper or a blend of a glass paper and a paper such as manila paper, kraft paper and the like with the blending ratio by weight per unit area of less than 80% when the blended separator is used. Moreover, although the separator (3) may have any thickness, a thickness of 80–200 μm is preferable to control a diameter size of the capacitor element (10) which is increased when a thicker separator is used. Moreover, reasons of the separator (3) of a glass paper or a blend of a glass paper and a paper are used to suppress an oxidizing reaction of an oxidizing agent in the solution mixture which is impregnated in the capacitor element (10) with the separator (3) for maintenance of the oxidizing ability of the oxidizing agent and improvement in permeability of the solution mixture.

The capacitor element (10) is formed by winding the anode foil (1) and the cathode foil (2) to interpose the separator (3) the therebetween. The opposite electrode foils (1) and (2) may have any size according to the specification of the solid electrolytic capacitor to be produced, and the separator (3) may also have a width size as slightly larger than the sizes of opposite electrode foils (1) and (2).

3,4-ethylenedioxythiophene may be obtained by a known process such as disclosed in the Japanese Laid-Open Patent Publication 2-15611. Further, the oxidizing agent is iron p-toluenesulfonate dissolved in ethylene glycol. A proportion of ethylene glycol to iron p-toluenesulfonate in the oxidizing agent may be arbitrary, but the proportion used in the present invention is 1:1. A blending ratio of the oxidizing agent to 3,4-ethylenedioxythiophene is preferably in the range of 1:3 to 1:15.

A process for impregnating a solution mixture of 3,4-ethylenedioxythiophene with an oxidizing agent into the capacitor element (10) may be of a known means such as vacuum impregnation method, pressure impregnation method and the like.

A process for preparing a solid electrolytic capacitor according to the present invention and a solid electrolytic capacitor thus obtained shall further be described in the following examples.

EXAMPLE 1

The anode foil (1) and the cathode foil (2) consist of valve action metals such as aluminum, tantalum and their surface areas are enlarged by the previous etching treatments. The anode foil (1) is further applied by a forming treatment to provide an oxide coating layer (4) of aluminum oxide.

The anode foil (1) and the cathode foil (2) are wound with a separator (3) of glass paper having a thickness of 80–200 μm to obtain a capacitor element (10).

In this example, the capacitor element (10) employed a diameter size of 4 φ and a longitudinal size of 7 mm. Further, the anode foil (1) and the cathode foil (2) of the capacitor element (10) have respectively electrical connections with lead wires (6), (7) protruding from the terminal surface of the capacitor element (10).

The capacitor element (10) thus constructed is impregnated with a solution mixture of 3,4-ethylendioxythiophene with an oxidizing agent. As the oxidizing agent, iron p-toluenesulfonate dissolved in ethylene glycol is used, a blending ratio of 3,4-ethylenedioxythiophene to the oxidizing agent is preferably in the range of 1:3 to 1:15.

The impregnation is carried out by dipping the capacitor element (10) into an impregnation bath for storing a constant amount of the solution mixture with the necessary pressure reduction.

The capacitor element (10) impregnated with the solution mixture is then picked up from the impregnation bath and is then allowed to stand for 15–2 hours at the polymerization temperature of 25–100° C. to produce a polyethylenedioxythiophene or a solid electrolyte layer (5) by the polymerization reaction.

Ranges of the polymerizing temperature and standing time may be arbitrarily varied in accordance with parameter of the capacitor element (10) to be produced within the aforementioned ranges, although when the polymerizing temperature is elevated, an electrostatic capacity, tan δ and impedance characteristics among the electric characteristics of the solid electrolytic capacitor are likely enhanced, but the leakage current characteristics tends to come down. The standing time may suitably be selected from approximately 15 hours at the polymerization temperature of 25° C., about 4 hours at 50° C., for 2 hours at 100° C., and most suitably 4 hours at 50° C. to meet with the coating result and duration of the solid electrolyte layer (5).

The capacitor element is then washed with water, organic solvents and the like for a period of approximately 120 min., followed by dryness at 100–180° C. for a period of 30 min., and then subjected to an aging process by applying approximately 40–60% of the voltage based on the voltage resistance of the anode foil (1) at an ambient temperature to complete a production of the solid electrolyte layer (5).

The process of production of the solid electrolyte layer (5) may be repeated by plural times on demands.

The capacitor element (10) in which the separator (3) is interposed between the anode foil (1) and the cathode foil (2) to form the solid electrolyte layer (5) is coated on its outer periphery with an armored resin, for example, to provide a solid electrolytic capacitor.

EXAMPLE 2

The capacitor element (10) which is produced in accordance with the Example 1 employed a separator (3) of a blend of a glass paper and a paper. The paper may be selected from a manila paper, a kraft paper and the like, but a manila paper has been used in the Example. The blending ratio by weight per unit area is less than 80% paper with the thickness of 80–200 μm.

The solid electrolytic capacitor according to Example 1 is compared with the conventional solid electrolytic capacitor to define the electrical characteristics.

As comparison examples, the capacitor elements of the same construction as Example 1 have been employed, and in Comparison Example 1 the capacitor element is impregnated with a monomer solution of pyrrole and oxidizing agent at an ambient temperature to form a solid electrolyte layer and in Comparison Example 2 the capacitor element is impregnated with a monomer solution of pyrrole and oxidizing agent at a low temperature such as approximately –10° C. to form a solid electrolyte layer.

Each ten samples have been prepared and the respective initial characteristics in average have been measured to show the results of the following Table 1.

TABLE 1

|  | Electrostatic capacity 120 Hz (μF) | tan δ 120 Hz (%) | ESR 100 KHz (mΩ) | Leakage current 10 V (μA) | Voltage resistance (B.D.V) |
| --- | --- | --- | --- | --- | --- |
| Com.Ex.1 | 7.5 | 11.3 | 180 | 83.0 | 10.0 |
| Com.Ex.2 | 10.5 | 2.5 | 50 | 0.5 | 18.0 |
| Ex.1 | 10.0 | 2.3 | 50 | 0.1 | 30.0 |

As shown in the results, the solid electrolytic capacitor according to Example 1 shows an equivalent electrostatic capacity and tan δ and an improved voltage resistance so compared with Comparison Example 2 in which polypyrrole is formed at a low temperature.

The solid electrolytic capacitor according to the aforementioned Example 2 is compared with the solid electrolytic capacitors with the solid electrolyte layer of polyethylenedioxythiophene prepared by the same process as Example 2, in which a manila paper has been used as a separator (Comparison Example 3), and a carbon paper which is formed by carbonization of manila paper at approximately 350–400° C. (Comparison Example 4) has used.

Each ten samples have been prepared in the same manner and the respective initial characteristics in average have measured to show the results in the following Table 2.

TABLE 2

|  | Electrostatic capacity 120 Hz (μF) | tan δ 120 Hz (%) | ESR 100 KHz (mΩ) | Leakage current 10 V (μA) |
| --- | --- | --- | --- | --- |
| Com.Ex.3 | 9.3 | 2.5 | 550 | 5.5 |
| Com.Ex.4 | 10.0 | 6.3 | 1050 | 10.3 |
| Ex.2 | 10.0 | 2.3 | 50 | 0.1 |

As seen from the results, in the Comparison Example 3 employing the conventional manila paper, an oxidative reaction with an oxidizing agent in the solution mixture impregnated in the capacitor element is developed with reduction of an oxidizing ability of the oxidizing agent and consequent poor adhesion of the anode foil to the oxide coating layer so that desired characteristics for the electrostatic capacity or impedance characteristics could not be obtained. Moreover, when a carbonized separator is employed, the leakage current characteristics is significantly reduced other than the impedance characteristics.

Figure 3:
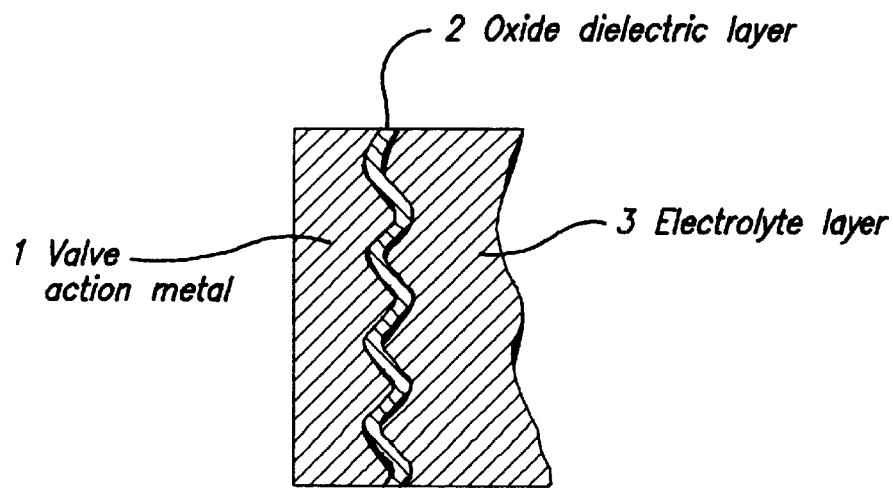
FIG. 3 shows a schematic sectional view of construction of the solid electrolytic capacitor according to the invention.

An electrolytic capacitor according to the present invention is obtained as shown in FIG. 3, in such a way that the valve action metal (1) on its surface is formed with the oxide dielectric layer (2) of the valve action metal (1) on which a solution of 3,4-ethylenedioxy-thiophene and a solvent of dihydric alcohol or trihydric alcohol and oxidizing agent are deposited for subsequent heating for facilitating the polymerization to provide the electrolyte layer (3) of polyethylenedioxy-thiophene.

The valve action metal (1) may include, for example, aluminum, tantalum, niobium, titanium and their alloys.

The oxide dielectric layer (2) may be provided by the known process. For example, when a sintered body of tantalum powder is employed, a sintered body of tantalum is allowed to an anodic oxidation in an aqueous solution of phosphoric acid to provide the oxide dielectric layer (2) of tantalum oxide on the surface of the porous sintered body. Alternatively, when aluminum foil is employed, the surface of the aluminum foil is allowed to an electrochemical etching for subsequent forming in an aqueous solution of boric acid and the like and the oxide dielectric layer (2) of aluminum is formed on the surface of aluminum foil of the valve action metal.

The capacitor may include such modes as a wound type, a sintered type, a laminated type and the like, for example, a wound type aluminum electrolytic capacitor, a sintered type tantalum electrolytic capacitor, a laminated type aluminum electrolytic capacitor for applications.

A dihydric alcohol for the solvent to be used in the present invention may be of ethylene glycol, propylene glycol, butanediol, pentanediol, hexylene glycol, hexanediol, heptanediol, octanediol, nonanediol, decanediol, pinacol, hydrobenzoin, benzpinacol, cyclopentanediol, cyclohexanediol, diethylene glycol, triethylene glycol and the like. Further, trihydric alcohol may be of glycerin, hexanetriol.

In particular, ethylene glycol, propylene glycol and hexylene glycol are preferable.

Furthermore, derivatives of dihydric alcohol may be of dihydric alcohol ethers, esters of dihydric alcohol and esters of dihydric alcohol ethers.

Dihydric alcohol ethers may be of ethylene glycol monomethylether, ethylene glycol monoethylether, ethylene glycol monobutylether, diethylene glycol monomethylether, diethylene glycol monoethylether, diethylene glycol dimethylether, diethylene glycol monoethylether, propylene glycol monobutylether, dipropylene glycol monomethylether, dipropylene glycol monoethylether and the like. Esters of dihydric alcohol may be of ethylene glycol monoacetate, ethylene glycol diacetate and the like. Esters of dihydric alcohol ethers may be of ethylene glycol monomethylether acetate, ethylene glycol monoethylether acetate, diethylene glycol monoethylether acetate and the like.

In particular, ethylene glycol monomethylether and ethylene glycol monoethylether are preferable.

Moreover, the solvents may include a solvent mixture containing at least two of solvents selected from dihydric alcohol, trihydric alcohol, dihydric alcohol ethers, esters of dihydric alcohol, esters of dihydric alcohol ethers and other derivatives of dihydric alcohol, or mixture solvent containing at least two of solvents selected from, for example, dihydric alcohol.

As oxidizing agent, for example, ferric chloride, ferric perchloride, and ferric iron of inorganic acid having organic groups such as iron p-toluenesulfonate or iron dodecylbenzenesulfonate, further, hydrogen peroxide, potassium bichromate, alkaline metal persulfate, ammonium persulfate, alkaline metal perborate, potassium permanganate, periodic acid, iodic acid, copper tetrafluoroborate and the like may be employed.

In particular, iron p-toluenesulfonate and iron dodecylbenzenesulfonate are preferable.

In the solid electrolytic capacitor produced by the process according to the present invention, a solvent of 3,4-ethylenedioxy-thiophene, dihydric alcohol, trihydric alcohol or derivatives of dihydric alcohol and a solution of an oxidizing agent are deposited onto the capacitor element for heating and polymerizing 3,4-ethylenedioxy-thiophene as monomer in the solution to obtain a poly-ethylenedioxy-thiophene which is a polymer of 3,4-ethylenedioxy-thiophene for forming the electrolyte layer (3).

When dihydric alcohol, trihydric alcohol or derivatives of dihydric alcohol is used as a solvent, the reaction is rapidly enhanced by holding the polymerizing reaction in improved condition and the electrolyte layer (3) having a high polymerization degree and conductivity as well as adhesive properties to the oxide dielectric layer (2) is formed to obtain an electrolytic capacitor of improved tan δ and ESR.

Particularly, the electrolyte layer (3) formed on the outer periphery of the sintered type tantalum electrolytic capacitor has improved adhesive properties to the tantalum sintered body with improved film formation properties. Namely, a solution of monomer, oxidizing agent and solvent is sufficiently penetrated into the porous portion of the sintered body of tantalum electrolytic capacitor for deposition onto the oxide dielectric layer (2), thereby to maintain the good reaction condition during heating and polymerization for performing a rapid polymerization reaction with an improved formation of the electrolyte layer (3).

EXAMPLE 3

Tantalum powder is subjected to a pressure molding to plant a tantalum lead and then the anode body of 1.9 mm×2.4 mm is applied by the formation voltage of 61V in an aqueous solution of phosphoric acid for the anodic oxidation to form an oxide coating layer of tantalum. Subsequently, 8 g of 3,4-ethylenedioxy-thiophene, 22 g of iron p-toluenesulfonate and 22 g of ethylene glycol are mixed at a room temperature and dipped in the solution to deposit the solution on the oxide coating layer, followed by heating at 80° C. for 30 min. to promote the polymerizing reaction, for formation of poly-ethylenedioxy-thiophene on the oxide coating layer. Subsequently, carbon layer and silver paste layer are formed in series by the known manner to provide a cathode conductive layer. The silver paste layer after formed is anchored with an anode lead wire by means of the conductive paste. Wrapping of epoxy resin is then formed by means of the transfer mold of epoxy resin to produce a tantalum electrolytic capacitor.

EXAMPLE 4

A sintered type tantalum electrolytic capacitor was produced in the same process as the forgoing Example but employing ethylene glycol monomethylether in place of ethylene glycol.

COMPARISON EXAMPLE 5

A sintered type tantalum electrolytic capacitor was produced in the same process as the forgoing Example but employing butanol in place of ethylene glycol.

Characteristics of the solid electrolytic capacitors produced in Examples 3–4 and Comparison Example 5 are shown in Table 3.

TABLE 3

|  | Electrostatic capacity (μF) (120 Hz) | tan δ (120 Hz) | ESR (Ω) (100 KHz) |
| --- | --- | --- | --- |
| Ex.3 | 1.17 | 0.011 | 0.395 |
| Ex.4 | 1.08 | 0.013 | 0.356 |
| Com.Ex.5 | 1.13 | 0.015 | 1.015 |

After the electrical etching treatment of the surface of aluminum foil, a formation voltage of 58V was applied in an aqueous solution of boric acid to form an oxide coating layer on the surface of aluminum etching foil to obtain an aluminum formation foil. The aluminum formation foil as an anode and the etching treated foil as a cathode were wound by the separator to produce an electrolytic capacitor element. Subsequently, 8 g of 3,4-ethylenedioxy-thiophene, 22 g of iron p-toluenesulfonate and 22 g of ethylene glycol were mixed at a room temperature and the electrolytic capacitor element was dipped in the solution for deposition of the solution onto the separator, followed by heating at 80° C. for 30 min. to promote the polymerizing reaction for formation of poly-ethylenedioxy-thiophene on the oxide coating layer. Subsequently, wrapping of epoxy resin is provided by means of the transfer molding of epoxy resin to produce, a wound type aluminum electrolytic capacitor.

COMPARISON EXAMPLE 6

A wound type aluminum electrolytic capacitor is produced by the same process as the aforementioned Example but employing butanol in place of ethylene glycol.

Characteristics of the solid electrolytic capacitors produced in Example 5 and Comparison Example 6 are shown in Table 4.

TABLE 4

|  | Electrostatic capacity (μF) (120 Hz) | tan δ (120 Hz) | ESR (Ω) (100 KHz) |
| --- | --- | --- | --- |
| Ex.5 | 10.8 | 0.011 | 0.025 |
| Ex.6 | 10.4 | 0.025 | 0.171 |

As shown in Table 3 and Table 4, when ethylene glycol or ethylene glycol monomethylether is employed as a solvent for 3,4-ethylenedioxy-thiophene and an oxidizing agent upon polymerization, tan δ and ESR are lower than the case of employing butanol, either in the sintered type tantalum electrolytic capacitor or in the wind rolling aluminum electrolytic capacitor and a solid electrolytic capacitor having a low impedance could be obtained. Moreover, in the sintered type tantalum electrolytic capacitor, an electrolyte layer formed on the exterior of the tantalum sintered body is closely adhered to the tantalum sintered body with improved film formation properties to obtain an improved electrolyte layer according to the present invention.

Possibility of Industrially Applicable

In the present invention the capacitor element of wound anode foil and cathode foil with a separator is impregnated with a solution mixture of 3,4-ethylenedioxythiophene and an oxidizing agent for penetration into inside of the capacitor element.

Further, by a gentle polymerizing reaction of 3,4-ethylenedioxy-thiophene and an oxidizing agent during or after penetration, polyethylenedioxythiophene or a solid electrolyte layer is formed inside of the capacitor element and the solid electrolyte layer is suspended by the separator from its producing process.

Therefore, elaborated and homogeneous solid electrolyte layer could be formed even inside of the capacitor element to enhance electric characteristics of the solid electrolytic capacitor and particularly for the voltage resistance, the improvement is remarkable together with the characteristics of polyethylenedioxythiophene per se as compared with the conventional solid electrolytic capacitors employing the conductive polymer for the solid electrolyte layer.

Moreover, for the capacitor element an anode foil and a cathode foil are wound by means of a separator under the constant clamping pressure and thus the anode foil, the cathode foil and the separator are adhered together under the constant pressure and the solid electrolyte layer suspended by the separator is also adhered to the anode foil under the constant pressure. Accordingly, adhesive properties of the oxide coating layer to the solid electrolyte layer on the anode foil are improved to obtain desired electric characteristics.

Furthermore, when a separator of a glass paper or a blend of glass paper and paper is used, a solution mixture of 3,4-ethylenedioxythiophene and an oxidizing agent is conveniently penetrated into the capacitor element and polyethylenedioxythiophene is formed inside of the capacitor element to improve characteristics of the product.

In a process for producing polyethylenedioxythiophene according to the invention, since thermal treatment at a high temperature is not operated as done in the conventional manganese dioxide or TCNQ complex, breakage of the oxide coating layer is depressed to enhance reliability of products without any injury of the lead wire by the thermal treatment for the direct use as an external connector.

Further, according to the present invention, dihydric alcohol, trihydric alcohol and derivatives of dihydric alcohol are used as solvent so that the rapid reaction is secured with improved polymerization to provide the electrolyte layer of high polymerization degree and conductivity and good adhesive properties to the oxide dielectric layer for obtaining a solid electrolytic capacitor of improved tan $\delta$ and ESR and low impedance may be obtained, since the formed electrolyte layer of poly-ethylenedioxy-thiophene is satisfactorily adhered to the oxide coating layer.

Furthermore, since solvents have relatively high boiling point, the polymerizing reaction state may be maintained at a high temperature for the rapid polymerization reaction with reduction of the polymerization time.

We claim:

1. A solid electrolytic capacitor comprising a capacitor element of wound anode and cathode foils with a separator of at least glass paper which is impregnated with a solution mixture of 3,4-ethylenedioxythiophene and an oxidizing agent and the solution mixture penetrated into the separator is then subjected to a polymerization reaction to form polyethylenedioxythiophene for providing an electrolyte layer which is suspended by the separator.

2. A solid electrolytic capacitor as claimed in claim 1, wherein the oxidizing agent is iron p-toluenesulfonate dissolved in ethylene glycol.

3. A solid electrolytic capacitor as claimed in claim 1, wherein the electrolyte layer is suspended by a separator of a blend of glass paper and paper.

4. A solid electrolytic capacitor as claimed in 3, wherein the ratio of paper to glass for the separator is less than 4:1.

5. A process for production of a solid electrolytic capacitor which process comprises impregnating a capacitor element of wound anode and cathode foils with a separator of at least glass paper with a solution mixture of 3,4-ethylenedioxythiophene and an oxidizing agent, and performing a polymerization reaction in the solution mixture penetrated into the separator to produce a polyethylenedioxythiophene.

6. A process as claimed in claim 5, wherein the oxidizing agent is iron p-toluenesulfonate dissolved in ethylene glycol.

7. A process as claimed in claim 5, wherein a separator of a blend of glass paper and paper is used.

8. A process as claimed in claim 7, wherein the ratio of paper to glass for the separator is less than 4:1.

9. A process for production of a solid electrolytic capacitor which comprises impregnating a capacitor element of wound anode and cathode foils with a separator of at least glass paper with a solution mixture of 3,4-ethylenedioxythiophene and an oxidizing agent to obtain an impregnated capacitor element and allowing the impregnated capacitor element to stand at 25–100° C. for 2–15 hours with desired repeats.

10. A process as claimed in claim 9, wherein the impregnated capacitor element is allowed to stand at 50° C. for 4 hours.

11. A process as claimed is claim 9, wherein the 3,4-ethylenedioxythiophene and the oxidizing agent are present in a ratio of 1:3 to 1:15 in the solution mixture.

12. A solid electrolytic capacitor in which a valve action metal on its surface is successively provided with a dielectric layer of a valve action metal oxide and an electrolyte layer of a conductive polymer and the electrolyte layer is polyethylenedioxythiophene produced by a polymerization reaction of 3,4-ethylenedioxythiophene with an oxidizing agent in at least solvent selected from dihydric alcohol, trihydric alcohol and a derivative of dihydric alcohol.

13. A solid electrolytic capacitor as claimed in claim 12, wherein the derivative of dihydric alcohol is a dihydric alcohol ether, an ester of dihydric alcohol or an ester of dihydric alcohol ether.

14. A solid electrolytic capacitor as claimed in claim 13, wherein the dihydric alcohol ether is ethylene glycol monomethylether or ethylene glycol monoethylether.

15. A solid electrolytic capacitor as claimed in claim 12, wherein the dihydric alcohol is ethylene glycol, propylene glycol or hexylene glycol.

16. A solid electrolytic capacitor as claimed in claim 12, wherein the oxidizing agent is iron p-toluenesulfonate, iron dodecylbenzenesulfonate or ferric chloride.

17. A process for production of a solid electrolytic capacitor which comprises a step of producing a dielectric layer of valve action metal, oxide on the surface of the valve action metal, depositing a solution containing 3,4-ethylenedioxythiophene, one or more solvent selected from dihydric alcohol, trihydric alcohol and dihydric alcohol derivatives and an oxidizing agent on the dielectric layer of valve action metal oxide to obtain a resultant product and heating the resultant product for facilitating a polymerization reaction to form polyethylenedioxythiophene as an electrolyte layer on the dielectric layer of valve action metal oxide.

18. A process as claimed in claim 17, wherein the derivative of dihydric alcohol is a dihydric alcohol ether, an ester of dihydric alcohol or an ester of dihydric alcohol ethers.

19. A process as claimed in claim 18, wherein the dihydric alcohol ether is ethylene glycol monomethylether or ethylene glycol monoethylether.

20. A process as claimed in claim 17, wherein the dihydric alcohol is ethylene glycol, propylene glycol or hexylene glycol.

21. A process as claimed in claim 17, wherein the oxidizing agent is iron p-toluenesulfonate, iron dodecylbenzenesulfonate or ferric chloride.

* * * * *